United States Patent
Valentin

(10) Patent No.: US 7,185,203 B2
(45) Date of Patent: Feb. 27, 2007

(54) METHOD FOR THE PROVISION OF AN INDIVIDUAL DEVICE CODE FOR AN ELECTRONIC DEVICE

(75) Inventor: Artur Valentin, Bobingen (DE)

(73) Assignee: Fujitsu Siemens Computers GmbH, Munich (DE)

( * ) Notice: Subject to any disclaimer, the term of this patent is extended or adjusted under 35 U.S.C. 154(b) by 706 days.

(21) Appl. No.: 10/054,946

(22) Filed: Jan. 25, 2002

(65) Prior Publication Data

US 2002/0144126 A1    Oct. 3, 2002

(30) Foreign Application Priority Data

Feb. 5, 2001    (DE) ................................ 101 05 059

(51) Int. Cl.
  *G06F 21/24*  (2006.01)
  *G06F 21/22*  (2006.01)
  *G06F 21/06*  (2006.01)
(52) U.S. Cl. .................... 713/182; 713/310; 380/59
(58) Field of Classification Search ................. 713/182
  See application file for complete search history.

(56) References Cited

U.S. PATENT DOCUMENTS

2001/0054010 A1 * 12/2001 Bernabeo et al. ............. 705/26
2001/0054014 A1 * 12/2001 Noda et al. .................... 705/26

OTHER PUBLICATIONS

Patent Abstracts of Japan, JP 2000-118314, Apr. 25, 2000.

* cited by examiner

*Primary Examiner*—Gilberto Barrón, Jr.
*Assistant Examiner*—Venkat Perungavoor
(74) *Attorney, Agent, or Firm*—Cohen, Pontani, Lieberman & Pavane LLC

(57) ABSTRACT

The invention relates to a method for the provision of a device code for an electronic device, which is at least required for the first commissioning of the device code, whereby the device is inoperable without the input of the device code. The method is characterized in that the following procedural steps are carried out: Storage of a device number and an appropriate device code in a database, delivery of the device to a further processing site and readout of the device code stored in the database in conjunction with the device number, whereby the previous or simultaneous storage of a selected code number in the database in conjunction with the device number is required for readout.

4 Claims, 1 Drawing Sheet

METHOD FOR THE PROVISION OF AN INDIVIDUAL DEVICE CODE FOR AN ELECTRONIC DEVICE

FIELD OF THE INVENTION

The invention relates to a method for providing an individual device code for an electronic device that is required for at least the initial commissioning of the device, whereby the device is inoperable without the input of the individual device code.

BACKGROUND OF THE INVENTION

The protection of a device by means of a device code is frequently used when, to prevent theft of the device, the latter should be equipped so that the theft is not worthwhile for a thief, since the stolen device is not operable. If the protection of certain devices by means of a device code is generally known, the number of thefts of these devices consequently decreases.

For example, the method is used for car radios, since a car radio can be easily removed by breaking into the car. Usually a PIN number is stored in the device and when the device is delivered, the customer is provided with this PIN number, for example, by means of a sticker on the operating instructions. Provided that the device and the PIN are kept in separate places, the device is thus inoperable and, consequently, it is of no interest to the thief. With car radios, the PIN number is required if a disconnection from the power system occurs or each time it is turned on.

Another means of preventing unauthorized use by means of a cell phone is known. In cell phones, a so-called SIM card is used by a cell phone supplier, without which the device cannot be operated. The SIM card is released by the cell phone supplier. However, this does not necessarily prevent the device from being stolen and used in conjunction with another SIM card.

SUMMARY OF THE INVENTION

The problem with the first method mentioned is that a device that is stolen before delivery to the customer is not protected, since the device and the information about the PIN number are delivered to the customer together. A thief in the integrated transport system thus receives all the information required to enable him to operate the device. With the second method mentioned, the owner of the cell phone is only protected from unauthorized telephone use, but this does not prevent the removal and use of the device with another SIM card.

The task of the invention is to provide a method for the provision of an individual device code for an electronic device in which theft protection is also ensured prior to the commissioning by the end customer. The method should be so easy to carry out that an economical operation is also possible with a large number of devices sold.

This task is solved by a method of the initially mentioned type, which is characterized by the execution of the following procedural steps in the order mentioned:
 electronic storage of a device number and of the appropriate device code in a database
 Delivery of the device to a further processing site
 Automatic electronic readout of the device code stored in the database in conjunction with the device number, whereby the previous or simultaneous electronic storage of a selected code number in the database in conjunction with the device number is required for readout.

The prerequisite for applying the method according to the invention is thus that the device can only be operated by the input of a device code. The device code is unknown until a code number, which is advantageously the invoice number produced at the time of purchase, is known and has been entered into the database. In this manner, it is ensured that the device code is only made known when the device has been properly purchased and has not been stolen. It is thus pointless for a thief to steal a device before it has been purchased.

The further processing site is advantageously the retail store where the end customer shops. However, it is also possible that this further processing site is the premises of an intermediary, or the shipping department of a major customer. The device code in conjunction with the device number is stored in a favorable configuration of the method by the manufacturer in the database. Alternatively, this data may also be stored, for example, by a wholesaler or a foreign marketing company. The electronic and automatic configuration is advantageous, since no labor-intensive services are required to release the devices or to pass on the individual device code. The methods according to the latest state-of-the-art, however, have been developed so that the production of a code or work with general codes is required only in particular cases, for which only an intentionally limited circle of people, i.e., the contractual partners of the manufacturer or other people from the service department or skilled workers need to be available.

The method according to the invention is particularly advantageous if the device code is stored in an unchangeable memory area. In computers, the memory area may be the BIOS, whereby these customarily unalterable and alterable memory areas are stored. If the device code is located in the unalterable memory area, then the device code also cannot be changed if the BIOS is reprogrammed.

BRIEF DESCRIPTION OF THE DRAWINGS

The method is explained in greater detail below by means of exemplary configurations. Shown are.

DETAILED DESCRIPTION OF THE PRESENTLY PREFERRED EMBODIMENTS

Figure 1:
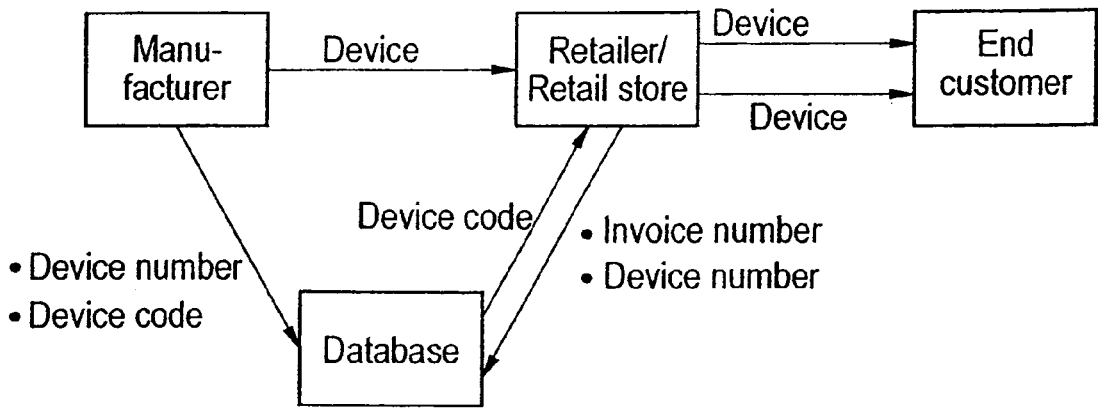
FIG. 1: A first configuration of the method according to the invention

FIG. 1 shows the sequence of operations of the method according to the invention. First, a device number and the appropriate device code for a device to be delivered are stored in a database. In this case, the manufacturer of the device performs this step. However, the device may be delivered to a distribution center. Subsequently, the device is delivered, whereby this device is not as a rule delivered directly to an end customer, but first to a further processing site, or an intermediary, such as a retailer. At this point in time, the device is not yet operable, because the device code is missing, which is at least required for the first commissioning of the device. However, the device code still cannot be read from the database. The prerequisite for readout of the device code is the input of a code number by the retailer. Such conditions for the readout of data can easily be implemented by electronic data processing systems. The invoice number that is produced when the device is sold is advantageously used as the code number.

The invoice number is then stored in the database in the record belonging to the corresponding device, which is identified by the device number. The device code is issued only after this storage. The device is now given together with the device code to the end customer, for example. Since the input of the invoice number is required, it is possible at any time to reconstruct when a particular device was purchased and by whom.

The connection of the retailer to the database takes place by means of a network connection. From the state-of-the-art, many security measures are known that prevent unauthorized persons from accessing the database network.

The device code may also be printed on the sales slip. If the user or the end customer forgets the device code, this information can readily be made available to him again once he has provided the device number and the invoice number.

Figure 2:
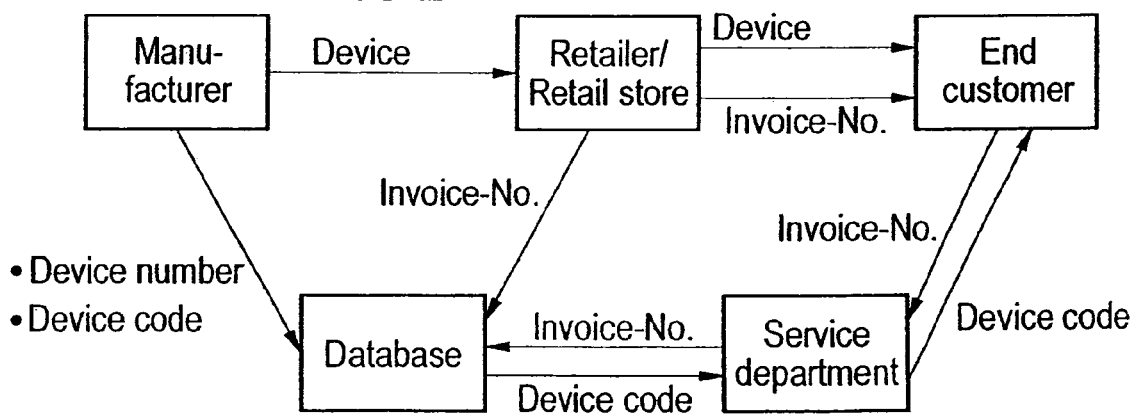
FIG. 2: A second configuration of a method according to the invention

FIG. 2 illustrates a variation of the exemplary configuration in FIG. 1. In this case, a device from a manufacturer is also delivered to further processing site, which is again a retailer in this case. The device code in conjunction with the device number has been previously stored in a database. However, in this case, the device code is not issued by the retailer, but only the invoice number together with the device number is stored in the database. The end customer receives the device and also knows the invoice number based on the invoice, which is stored in the database for his device. The end customer himself obtains the device code.

However, in the exemplary configuration of FIG. 2, the end customer cannot directly access the database, but there is a service department that receives the invoice number and the device number from the end customer and which produces the device code based on these numbers and passes it on to the end customer. The end customer may contact the service department by telephone, using a free telephone number for example, by a voice-activated computer or by E-mail.

Stolen devices can also be handled by the service department. Employees in the integrated transport system affected by a stolen device, thus either the manufacturer, a shipper, the retailer or the end customer, informs the service department of the stolen device with a certain device number. A remark is entered into the database for the corresponding device that the device has been stolen. If the person in possession of the stolen device later attempts to obtain the device code through the service department, it is immediately recognized that it concerns a stolen device, and the thief can be more easily detected in this manner. Of course, the entry of a theft warning can also be made directly in the database, without the intervention of the service department.

The database can be further used to store various stations of a device, since their transport is usually complicated, as illustrated in FIGS. 1 and 2. Then the device is normally transported from the manufacturer by means of a shipper to an intermediate storage warehouse, from where it is transported by a second shipper to a wholesaler, for example, also to a central distribution depot of a distribution system. The latter transports the products to the branches by means of a third shipper, from which the end customer can purchase the device. If, for example, the intermediate storage warehouse notes in the database that the device has been delivered and that it has also been delivered again, a frequency of theft at a certain part of the route can be easily detected.

Figure 3:
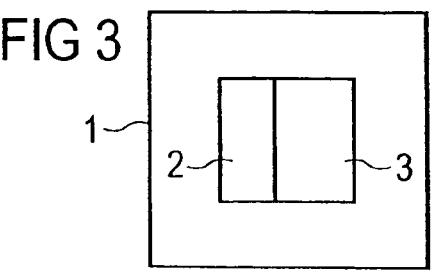
FIG. 3: The storing of the device code in a device.

For a successful application of the method according to the invention, it is necessary that the device can be operated only after the input of the device code. This means that the device code must also be stored in the device, so that the stored device code and the device code entered can be compared. For example, with computers, so-called BIOS passwords are already known, although these are located in a part of the BIOS where they can be written. As a result, it is obvious that the BIOS password can usually be changed. Advantageously, as illustrated in FIG. 3, a device 1 contains a memory in the BIOS, whereby a part 3 of the memory can be written and read and another part that cannot be changed. In the part that cannot be changed, fundamental system operations are stored, whose change would make the device operable. In the part 3 of the memory, which is changeable, however, functions are stored that ought to be changeable and in which device configurations or certain options are stored for the execution of function. If the device code is stored in the unchangeable part of the BIOS that cannot be read from the outside, the device code cannot be changed or read out by a software program.

The method according to the invention is an advantage from the financial point of view for all those concerned. In this manner, the manufacturer prevents devices from being stolen on the route and from his having to pay for replacement devices. But devices are also stolen in retail stores, be it by warehouse workers, employees or customers. Once the device has been delivered to the retailer, however, the manufacturer is no longer responsible for replacements. It is thus in the retailer's interest to make it harder to steal devices. Finally, for the end customer, and thus for the user of the device, the method is particularly advantageous if the device code is requested when the device is commissioned. Thus the stealing of a Notebook is no longer attractive if it is known that such devices are protected by a device code and that the latter cannot be obtained by an unauthorized person.

Storage in the unchangeable part of the BIOS does not lead to a reprogramming of the BIOS or to a disconnection from the internal battery.

What is claimed is:

1. A method for preventing unauthorized use of an electronic device, the method comprising the steps of:
   electronically storing a device number and an appropriate device code in a database, wherein the appropriate device code is required to operate the device, at least for the first commissioning of the device;
   rendering the device to be inoperable until it receives the appropriate device code;
   delivering the device to a further processing site; and
   enabling electronically reading out from the database the appropriate device code stored in conjunction with the device number only when a selected code number is provided in conjunction with the device number, whereby the appropriate device code read out from the database is usable to operate the device for at least the first commissioning of the device.

2. The method according to claim 1, wherein the appropriate device code is stored in the device in an unchangeable memory area that cannot be read by outsiders.

3. The method according to claim 1, wherein the code number is an invoice number of a retailer.

4. The method according to claim 1, wherein the device code is stored in the database in conjunction with an appropriate device number from a manufacturer of the device.

* * * * *